(12) United States Patent
Otake et al.

(10) Patent No.: US 12,007,026 B2
(45) Date of Patent: Jun. 11, 2024

(54) WIND-AND-RAIN GUARD DEVICE FOR SHIPPING

(71) Applicant: IHI Transport Machinery Co., Ltd, Tokyo (JP)

(72) Inventors: Yasuhiro Otake, Tokyo (JP); Shuhei Kinugawa, Tokyo (JP); Yasuhiro Kawasaki, Tokyo (JP)

(73) Assignee: IHI TRANSPORT MACHINERY CO., LTD, Tokyo (JP)

( * ) Notice: Subject to any disclaimer, the term of this patent is extended or adjusted under 35 U.S.C. 154(b) by 253 days.

(21) Appl. No.: 17/636,141

(22) PCT Filed: Aug. 28, 2020

(86) PCT No.: PCT/JP2020/032701
§ 371 (c)(1),
(2) Date: Feb. 17, 2022

(87) PCT Pub. No.: WO2021/059867
PCT Pub. Date: Apr. 1, 2021

(65) Prior Publication Data
US 2022/0290757 A1    Sep. 15, 2022

(30) Foreign Application Priority Data
Sep. 24, 2019  (JP) .................................. 2019-173065

(51) Int. Cl.
*F16J 15/10* (2006.01)
*B63B 19/18* (2006.01)
*B63B 19/26* (2006.01)

(52) U.S. Cl.
CPC ............... *F16J 15/10* (2013.01); *B63B 19/18* (2013.01); *B63B 19/26* (2013.01)

(58) Field of Classification Search
CPC ......... B63B 19/00; B63B 19/12; B63B 19/14; B63B 19/18; B63B 19/26; B63B 19/28;
(Continued)

(56) References Cited

U.S. PATENT DOCUMENTS 3,800,723 A * 4/1974 Collins ................... B63B 19/16
114/69
4,237,809 A * 12/1980 Hickmann .............. B63B 19/18
114/361
(Continued)

FOREIGN PATENT DOCUMENTS

CN           1329554 A     1/2002
CN         200971153 Y    11/2007
(Continued)

OTHER PUBLICATIONS

First Office Action corresponding to Chinese Patent Application No. 202080052587.4, dated May 10, 2023 and its English translation.
International Search Report for PCT/JP2020/032701 Dated Oct. 15, 2020.

*Primary Examiner* — Daniel V Venne
(74) *Attorney, Agent, or Firm* — McCormick, Paulding & Huber, PLLC

(57) ABSTRACT

The wind-and-rain guard device for shipping is provided that can restrain wind and rain from seeping in from between the sliding hatch cover and the hatch coaming. The wind-and-rain guard device for shipping 30 includes a water-stop member 31 that closes a gap formed between a sliding hatch cover 11 and a hatch coaming 14 when the sliding hatch cover 11 is lifted from the hatch coaming 14.

7 Claims, 5 Drawing Sheets

(58) Field of Classification Search
CPC ......... B63B 27/00; B63B 27/28; B65G 63/00; F16J 15/10
USPC .............................. 114/200, 201 R, 202, 361
See application file for complete search history.

(56) References Cited

U.S. PATENT DOCUMENTS

| | | | |
|---|---|---|---|
| 5,931,111 A * | 8/1999 | Shields | ................. B63B 17/023 |
| | | | 114/201 R |
| 7,966,960 B2 * | 6/2011 | Linares | ................... B63B 19/18 |
| | | | 114/201 R |
| 8,359,994 B1 | 1/2013 | Highfield | |
| 8,490,560 B2 * | 7/2013 | Walker | ................... B63B 17/02 |
| | | | 114/202 |
| 8,818,586 B2 | 8/2014 | Pereira | |
| 2019/0002059 A1 | 1/2019 | Salles | |

FOREIGN PATENT DOCUMENTS

| | | |
|---|---|---|
| CN | 206049977 A | 3/2017 |
| CN | 206336400 U | 7/2017 |
| CN | 107554699 A | 1/2018 |
| JP | 6094888 A | 5/1985 |
| JP | 62137194 U | 8/1987 |
| JP | 05199332284 U | 5/1993 |
| JP | 06271087 A | 9/1994 |
| JP | 3179239 B2 | 6/2001 |
| JP | 2006205965 A | 8/2006 |
| JP | 2009-23397 A | 2/2009 |
| JP | 2013144529 A | 7/2013 |
| JP | 201985236 A | 6/2019 |
| JP | 2019085236 A | 6/2019 |

* cited by examiner

WIND-AND-RAIN GUARD DEVICE FOR SHIPPING

CROSS-REFERENCE TO RELATED APPLICATIONS

This application is a National Stage application of International Patent Application No. PCT/JP2020/032701, filed on Aug. 28, 2020, which claims priority to Japanese Patent Application No. 2019-173065 filed on Sep. 24, 2019, each of which is hereby incorporated by reference in its entirety.

BACKGROUND

Technical Field

The present disclosure relates to a wind-and-rain guard device for shipping, which, when loading cargo such as grains or the like on a ship with a shiploader, prevents the cargo from getting wet from rainfall, and prevents the cargo being loaded from scattering by the wind.

Background Art

As devices for preventing cargo being loaded from getting wet from rainfall, those described in Japanese Patent Publication No. 3179239 and U.S. Pat. No. 8,818,586 are known.

With the device described in Japanese Patent Publication No. 3179239, a building is constructed on the quay, and an overhanging roof is provided for this building.

Also, the device described in U.S. Pat. No. 8,818,586 covers a hatch with a film that hangs from a shiploader.

However, the device described in Japanese Patent Publication No. 3179239 is problematic in that it is difficult to cope with large vessels, and, furthermore, the cost of installation is high.

Also, the device described in U.S. Pat. No. 8,818,586 is comprised of many pieces of equipment, and therefore is problematic in that its control is complex and expensive, and in that, furthermore, the shiploader also has to be modified in many ways, which entails high costs of modifications.

SUMMARY

So, the following rain-guard device for shipping may be a possible solution to these problems. This rain-guard device for shipping has a pair of rails, which are placed on sliding hatch covers on both sides of a hatch opening, an on-board chute, which is placed across these rails, and an expandable and contractable lid member, which closes the part of the hatch opening that is not covered by the on-board chute.

Such a rain-guard device for shipping can be applied to large vessels, and can be provided at low cost.

However, as described in patent literatures 3 and 4, some sliding hatch covers rise from hatch coaming when opened. The sliding hatch cover having such a structure is separated from the hatch coaming when the hatch opening is formed. Therefore, it is conceivable that a gap is formed between the sliding hatch cover and the hatch coaming during loading, and wind and rain may seep into the hold through this gap.

So, the present disclosure has been made in view of the above circumstances, and it is an object of the present disclosure to provide a wind-and-rain guard device for shipping that can restrain wind and rain from seeping in from between the sliding hatch cover and the hatch coaming.

According to one aspect of the present disclosure, a wind-and-rain guard device for shipping is provided, that comprises a water-stop member that closes a gap formed between a sliding hatch cover and a hatch coaming when the sliding hatch cover is lifted from the hatch coaming.

Preferably, the water-stop member is formed in a plate shape.

Preferably, the wind-and-rain guard device for shipping further comprises a stand part that is placed on the hatch coaming and holds the water-stop member in an upright state.

Preferably, the sliding hatch cover includes a seal holding part for holding a seal member to be seated on the hatch coaming, the seal holding part has a lower end part protruding downward from the seal member, and two water-stop members are provided on the stand part so as to sandwich the lower end part of the seal holding part.

Preferably, the water-stop member is formed in a sheet shape.

Preferably, the wind-and-rain guard device for shipping further comprises a hanger part detachably provided on the sliding hatch cover for suspending the water-stop member.

According to the present disclosure, it is possible to restrain wind and rain from seeping in from between the sliding hatch cover and the hatch coaming.

DETAILED DESCRIPTION

Figure 1:
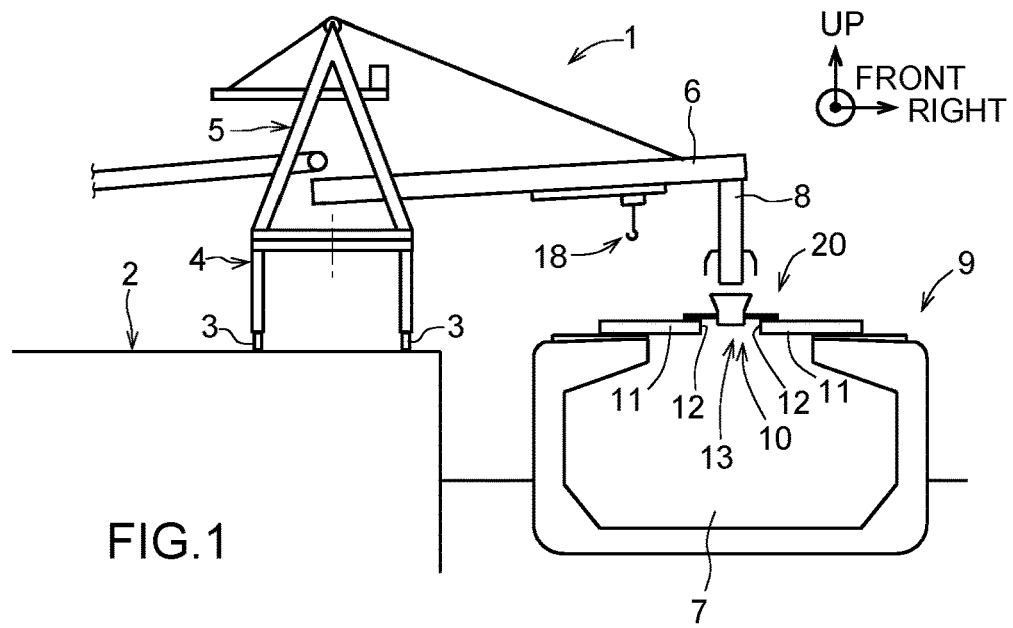
FIG. 1 is a schematic front sectional view of a vessel in which a rain-guard device for shipping is installed.
Figure 2:
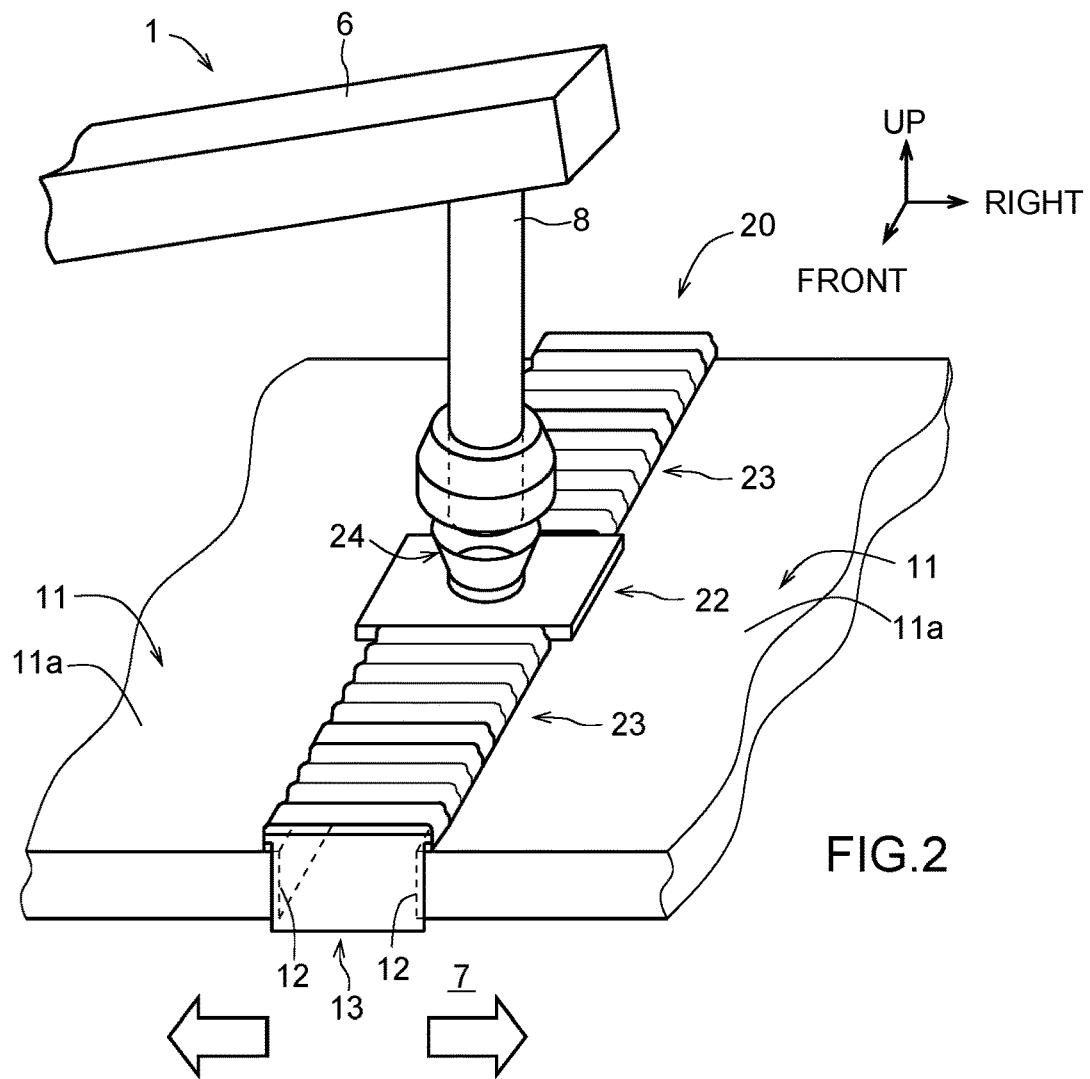
FIG. 2 is a perspective view of a main part of FIG. 1.
Figure 3:
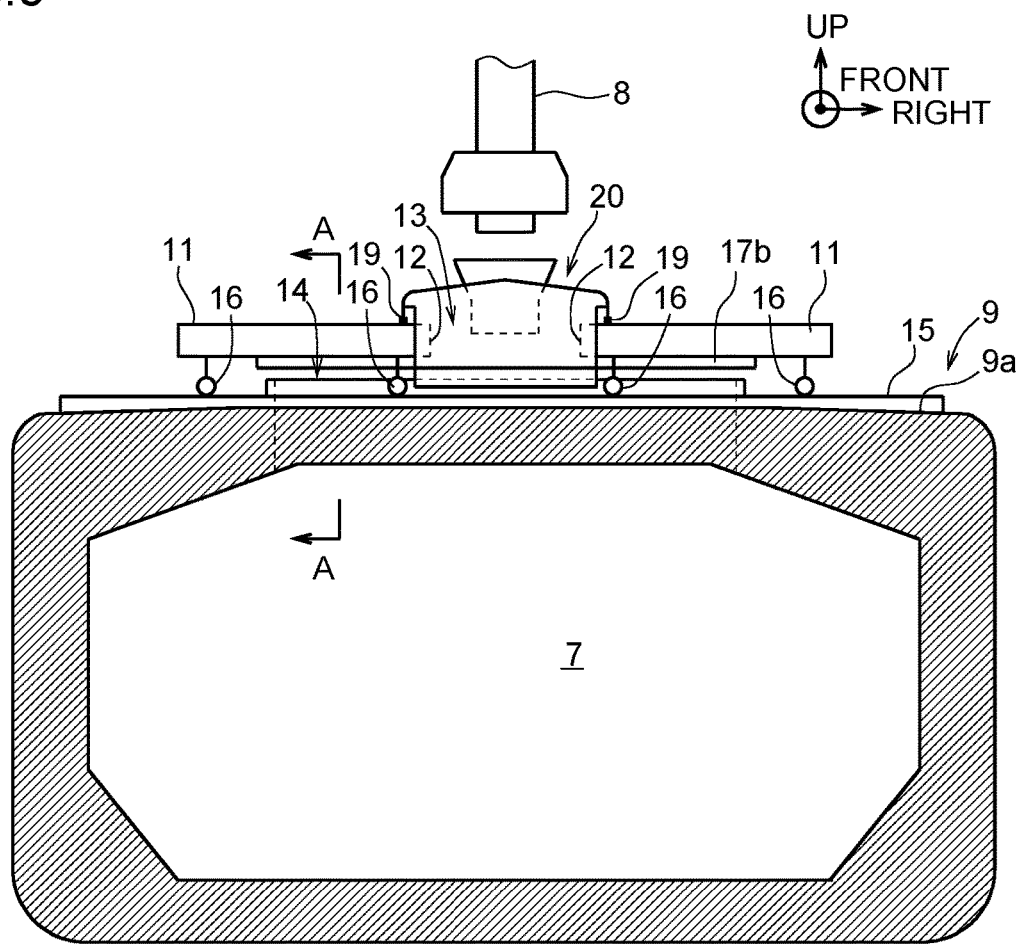
FIG. 3 is a front cross-sectional view of the vessel in which a hatch opening is formed.
Figure 4:
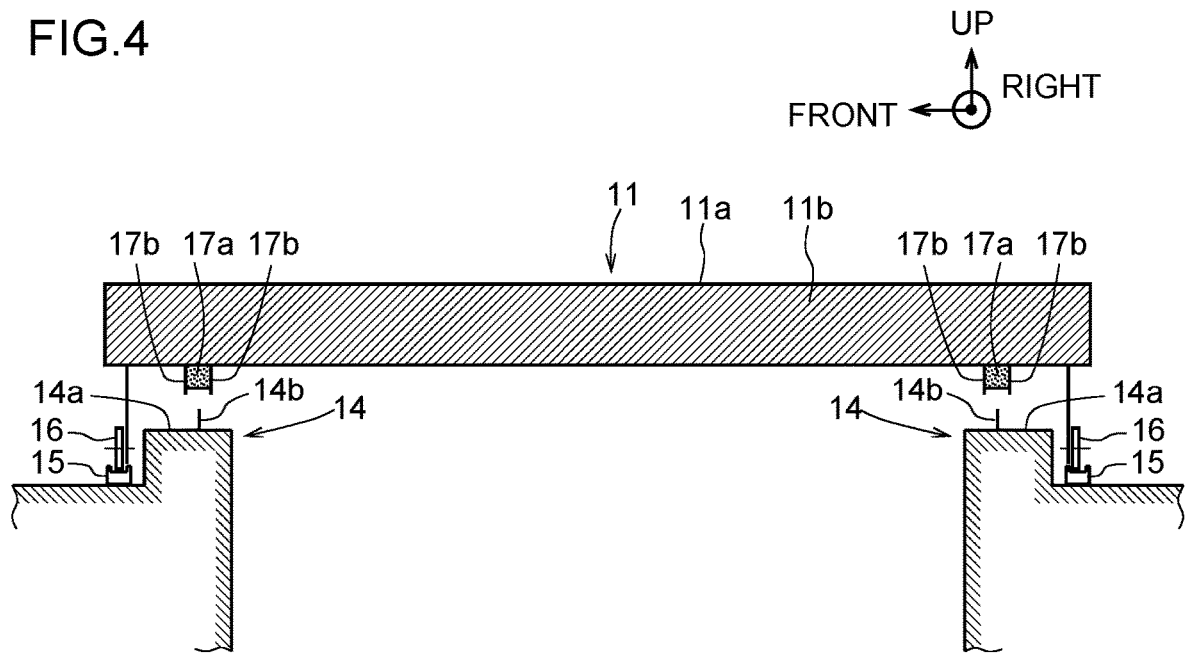
FIG. 4 is a cross-sectional view taken along line A-A in FIG. 3.

Now, embodiments of the present disclosure will be described below with reference to the accompanying drawings. FIG. 1 is a schematic front view of a shiploader, a vessel, and a rain-guard device for shipping according to the present embodiment. FIG. 2 is a schematic perspective view of a rain-guard device for shipping as installed on a vessel, seen from a high oblique angle. FIG. 3 is a front view of sliding hatch covers and a lid member. Note that, for ease of description, with the present embodiment, the directions along which the sliding hatch covers open and close are left and right directions, and directions that are horizontal and at right angles to these left and right directions are front and rear directions.

First, the shiploader and the vessel will be described.

As shown in FIG. 1, a shiploader 1 has a traveling part 4, which travels on a rail 3 laid on the quay 2, a rotating part 5, which is provided on the traveling part 4 in a rotatable manner, a boom 6, which is provided on the rotating part 5 so as to be raised and lowered freely, and a chute part 8, which hangs from the tip of the boom 6, and which supplies cargo such as grains or the like into a hold 7. The boom 6 is provided with a conveyor (not shown) for transporting the cargo from the quay 2 to the chute part 8. Note that the cargo is not limited to grains. The cargo may be other bulk materials that are preferred not to get wet in the rain.

Also, the shiploader 1 is provided with an unloading device 18, which lifts components of the rain-guard device for shipping, which will be described later, so as to move up and down freely. The unloading device 18 is comprised of a hoist, and provided in the boom 6 of the shiploader 1.

As shown in FIGS. 1 and 3, the vessel 9 is a cargo ship. The vessel 9 has a hold 7 with an upper opening 10, a hatch coaming 14 provided upright on a deck 9a of the vessel 9 to reinforce the outer circumference of the upper opening 10, sliding hatch covers 11 which open and close the upper opening 10, and a guide rail 15 for guiding the sliding hatch cover 11 in open and close directions.

The hatch coaming 14 is formed in a rectangular frame shape when viewed from above, and defines the upper opening 10. Further, a seal receiving part 14b that comes into contact with a seal member described later is integrally formed on an upper surface 14a of the hatch coaming 14. The seal receiving part 14b is formed in an upright plate shape. The seal receiving part 14b is formed over the entire circumference of the hatch coaming 14. That is, a shape of the seal receiving part 14b viewed from above is set to a rectangular frame shape having the same shape as the hatch coaming 14.

A pair of sliding hatch covers 11 are provided opposite each other on both the left and right sides of the vessel 9, and, furthermore, provided so as to be slidable in left and right directions (directions along the vessel's width). That is, the sliding hatch covers 11 are designed to open left and right, and the upper opening 10 closes as the opposing ends 12 press against each other, and the upper opening 10 opens as the opposing ends 12 part from each other. Further, the sliding hatch cover 11 includes traveling wheels 16 that travel along the guide rail 15. The guide rails 15 are provided on the deck 9a which is separated forward from the hatch coaming 14, and is provided on the deck 9a which is separated rearward from the hatch coaming 14. These guide rails 15 are arranged so as to extend in left and right directions (open and close directions of the sliding hatch cover 11), and are arranged in parallel. Further, when the sliding hatch cover 11 is closed, a part of the guide rail 15 on which the traveling wheel 16 is located (hereinafter referred to as a closed position part) and the other part are separated in advance and formed as separate bodies. The closed position part is configured to be lifted and lowered by a lifting device such as a hydraulic jack (not shown). When the sliding hatch cover 11 is closed, the lifting device lowers the closed position part to a position lower than the other part. As a result, the sliding hatch cover 11 is lowered and seated on the hatch coaming 14. Further, the lifting device is configured to lift the closed position part to the same height as the other part before the sliding hatch cover 11 starts traveling when the sliding hatch cover is opened. As a result, the sliding hatch cover 11 is lifted and separated from the hatch coaming 14, so that the sliding hatch cover 11 can travel.

Further, the sliding hatch cover 11 has a plate-shaped cover body 11b that closes half of the upper opening 10 of the hold 7 in the left and right directions, a seal member 17a provided on a bottom surface of an outer peripheral part of the cover body 11b and seated on the seal receiving part 14b of the hatch coaming 14, and a seal holding part 17b for holding the seal member 17a. The seal member 17a is made of soft resin such as rubber. The seal member 17a is formed in U-shape in a plan view, and is formed so as to face the seal receiving part 14b over right half circumference or left half circumference. The seal holding parts 17b are formed in plate shape and hold the seal member 17a by sandwiching it from inner peripheral side and outer peripheral side. That is, the seal holding parts 17b are provided so as to project downward from the bottom surface of the cover main body 11b to be along the outer peripheral surface and the inner peripheral surface of the seal member 17a. Further, the seal holding parts 17b have lower end part that protrude downward from the seal member 17a. The seal holding part 17b is not limited to this. For example, the seal holding part 17b may be formed in U-shaped cross section. In this case, the seal holding part 17b may be provided on the cover main body 11b with U-shaped opening facing downward. Also in this case, lower end of U-shape may be projected downward from the seal member 17a.

Also, the sliding hatch covers 11 are formed so as to open up the upper opening 10 at an arbitrary distance. In the following description, an opening will be formed between the sliding hatch covers 11 when the sliding hatch covers 11 open, and this opening, viewed from above, will be referred to as "hatch opening 13". Note that the sliding hatch covers 11 may be provided so as to be slidable in front and rear directions with respect to the vessel 9.

The above-mentioned sliding hatch cover 11 is an example, and is not limited to this. The sliding hatch cover 11 may be one that is relatively upwardly separated from the hatch coaming 14 when opened. Further, technique for lifting and lowering the sliding hatch cover 11 described above is widely known as described in patent literature 4. Further, technique of sealing between the lowered sliding hatch cover 11 and the hatch coaming 14 with the seal member 17a and the seal receiving part 14b is widely known as described in patent literature 5.

Next, the rain-guard device for shipping 20 will be described.

As shown in FIG. 2 and FIG. 3, the rain-guard device for shipping 20 has rails 19, which are placed on the sliding hatch covers 11, an on-board chute 22, which is provided on the rails 19 in a travelable manner, and which covers part of the hatch opening 13, and lid members 23, which cover the rest of the hatch opening 13.

The rails 19 are placed on the left and right sliding hatch covers 11 in parallel, to extend in front and rear directions.

The on-board chute 22 has a chute body part 24 for supplying cargo from the shiploader 1 into the hold 7. The chute body part 24 is formed in a cylindrical shape, extending in the vertical direction.

The lid members 23 are formed so as to expand and contract in front and rear directions, and placed in front and rear of the on-board chute 22. To be more specific, the lid members 23 has a part that expands and contracts in a bellows manner in front and rear directions. One end of each lid member 23 in front and rear directions is fixed to the on-board chute 22. The other end of each lid member 23 with respect to front and rear directions is fixed to a rail 19 near an end part of the hatch opening 13. This allows the lid members 23 to expand and contract as the on-board chute 22 travels. For example, when the on-board chute 22 travels forward, the lid member 23 on the front side of the on-board chute 22 is retracted forward, and the lid member 23 on the rear side of the on-board chute 22 expands forward.

By the way, when the sliding hatch covers 11 are opened, the hatch opening 13 formed between upper surfaces 11a thereof can be closed by the rain-guard device for shipping 20. Therefore, it is possible to prevent or restrain water from seeping from the hatch opening 13 into the hold 7. However, there is a possibility that wind and rain may enter the hold 7 through the gap between the hatch coaming 14 and the sliding hatch cover 11 formed when the sliding hatch covers 11 are opened.

Figure 5:
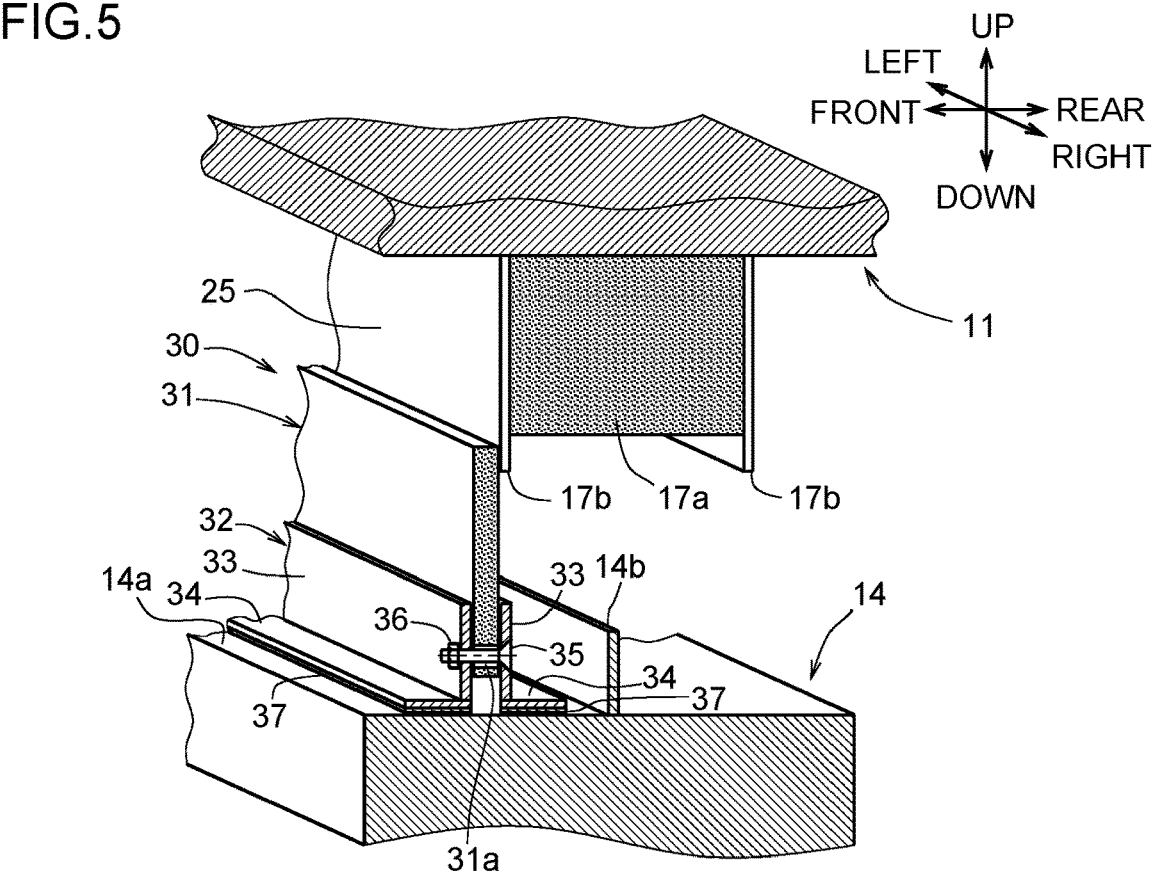
FIG. 5 is an enlarged perspective cross-sectional view of a state in which a wind-and-rain guard device for shipping according to an embodiment of the present disclosure is installed in a main part of FIG. 4.

Therefore, as shown in FIG. 5, the present embodiment provides a wind-and-rain guard device for shipping 30 for restraining water from seeping in from between the hatch coaming 14 and the sliding hatch cover 11. The wind-and-rain guard device for shipping 30 has a water-stop member 31 that closes a gap formed between the sliding hatch cover 11 and the hatch coaming 14 when the sliding hatch cover 11 is lifted from the hatch coaming 14.

Specifically, the wind-and-rain guard device for shipping 30 includes a plate-shaped water-stop member 31, and a stand part 32 that holds the water-stop member 31 in an upright state.

The water-stop member 31 is made of resin such as rubber. Further, the water-stop member 31 has such hardness at least not deformed by its own weight when lower end part is supported and the water-stop member 31 is erected vertically. Further, a length of the water-stop member 31 in left and right direction (length along the seal holding part 17b) is set to a length obtained by dividing a length of the seal holding part 17b in left and right directions into a plurality of parts. That is, the water-stop members 31 are set so as to cover the entire length of the seal holding part 17b in left and right directions by being connected in left and right directions.

The stand part 32 is configured by attaching angle members having L-shaped cross section to both front and rear surfaces of the water-stop member 31 symmetrically in the front and rear directions. However, as the stand part 32, a member having shape other than the angle member having L-shaped cross section may be used as long as the water-stop member 31 can be fastened and made to stand on its own. Erected parts of the angle members (hereinafter, fixed part 33) are arranged in front and rear of the water-stop member 31. The pair of fixed parts 33 are fastened by a bolt 35 inserted into a through hole 31a of the water-stop member 31 and a nut 36 screwed on the bolt 35. A bent part with respect to the fixed part 33 of the angle member (hereinafter referred to as a seating part 34) is seated on the hatch coaming 14. Further, a water-stop material 37 is provided on the bottom surface of the seating part 34. The water-stop material 37 is made of resin sheet such as rubber and is adhered to the bottom surface of the seating part 34. Further, a length of the stand part 32 in left and right directions is set to be the same as the length of the water-stop member 31 in left and right directions.

Further, the stand part 32 is formed so that the upper end part of the water-stop member 31 is located higher than lower end of the seal holding part 17b, and lower than upper end of the seal holding part 17b. As a result, when the wind-and-rain guard device for shipping 30 is installed on the hatch coaming 14, the water-stop member 31 and the seal holding part 17b can be brought into surface contact with each other, and seeping of water from between the water-stop member 31 and the seal holding part 17b can be restrained with a simple structure.

Next, effects of the present embodiment will be described below.

When loading the load into the hold 7 in the presence of wind and rain, the sliding hatch covers 11 are opened by a predetermined amount to form a hatch opening 13 between the sliding hatch covers 11, and then the rain-guard device for shipping 20 is placed on the sliding hatch covers 11. Thereby, the hatch opening 13 is closed by the rain-guard device for shipping 20.

After that, the wind-and-rain guard device for shipping 30 is installed on the hatch coaming 14. At this time, while the water-stop material 37 is placed on the hatch coaming 14 and the stand part 32 is placed, the upper end part of the water-stop member 31 is contacted with the outer peripheral surface 25 of the seal holding part 17b. In addition, a plurality of wind-and-rain guard devices for shipping 30 are arranged in a row in left and right directions in the same posture. As a result, the gap between the hatch coaming 14 and the sliding hatch cover 11 is closed. The water-stop material 37 restrains rainwater collected on the hatch coaming 14 from entering from between the hatch coaming 14 and the stand part 32. Further, the stand part 32 and the water-stop member 31 form a liquid-tight wall and close between the hatch coaming 14 and the sliding hatch cover 11. As a result, it is possible to restrain or suppress wind and rain from seeping in from between the sliding hatch cover 11 and the hatch coaming 14.

Although an embodiment of present disclosure has been described above in detail, the present disclosure is also capable of other embodiments such as the followings.

(1) The wind-and-rain guard device for shipping 30 is provided with the stand part 32, but is not limited to this. For example, if the water-stop member 31 is self-supporting, the stand part 32 may be omitted.

Figure 6:
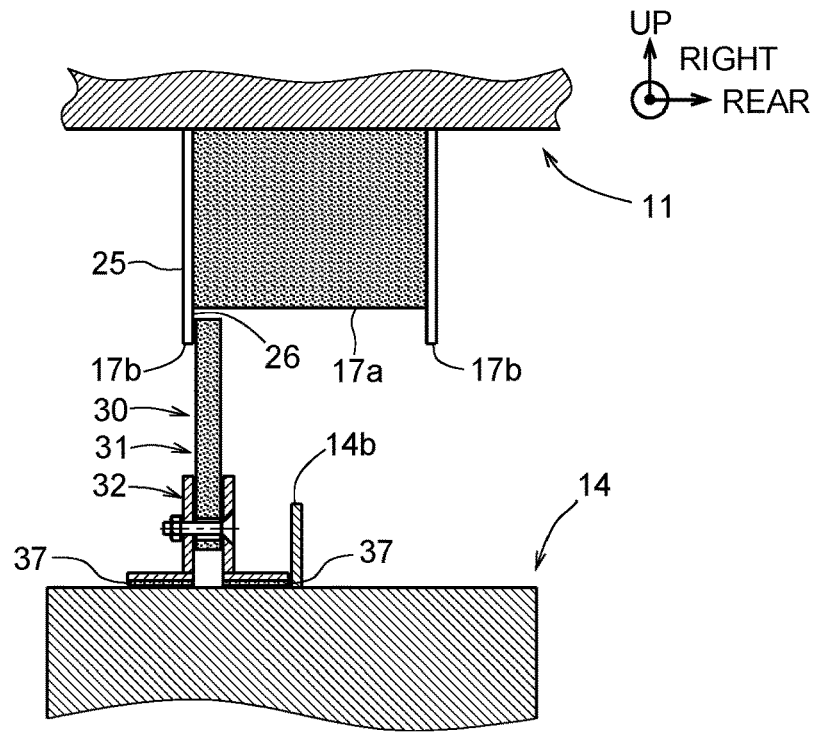
FIG. 6 is an enlarged cross-sectional view of the wind-and-rain guard device for shipping, an installation position of which is changed.

(2) The water-stop member 31 of the wind-and-rain guard device for shipping 30 is in contact with the outer peripheral surface 25 of the seal holding part 17b, but is not limited to this. As shown in FIG. 6, the water-stop member 31 of the wind-and-rain guard device for shipping 30 may be in contact with an inner peripheral surface 26 of the seal holding part 17b. Further, the wind-and-rain guard device for shipping 30 may be set so that the stand part 32 is positioned when it comes into contact with the seal receiving part 14b.

Figure 7:
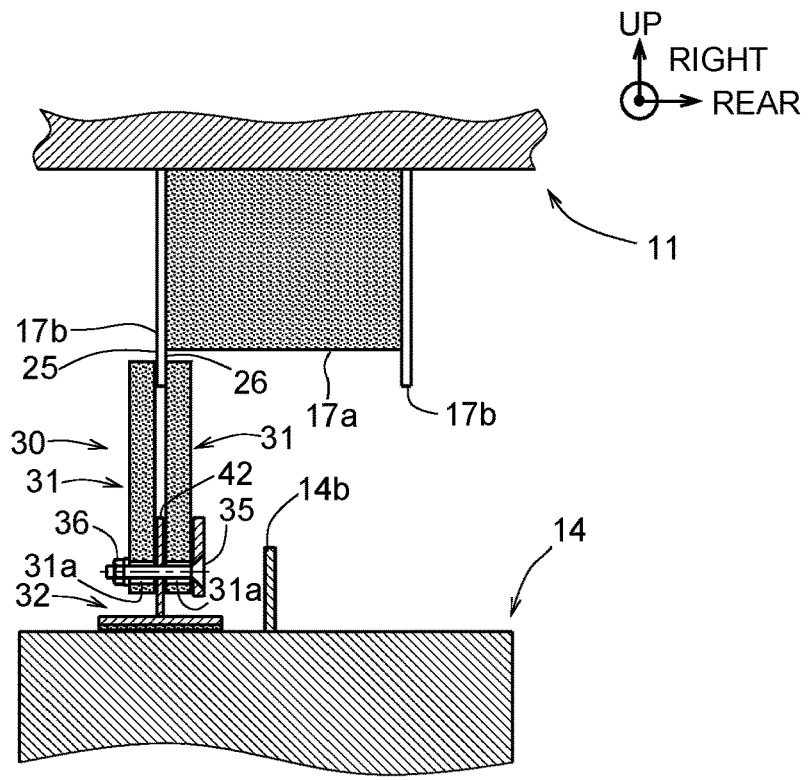
FIG. 7 is an enlarged cross-sectional view of the wind-and-rain guard device for shipping showing another embodiment.

(3) Further, the stand part 32 is provided with one water-stop member 31, but is not limited to this. As shown in FIG. 7, two water-stop members 31 may be provided on the stand part 32 so as to sandwich the lower end part of the seal holding part 17b. In this case, it is preferable that a plate material for separating the water-stop members 31 is interposed between two water stop members 31. Further, this plate material may be integrally formed with the stand part 32. Specifically, the stand part 32 may be formed in an upside-down T-shape, and an upright part of the stand part 32 (hereinafter, upright part 42) may form the plate material. Further, it is preferable that two water-stop members 31 are fastened to the upright part 42 with bolts 35 and nuts 36.

Figure 8:
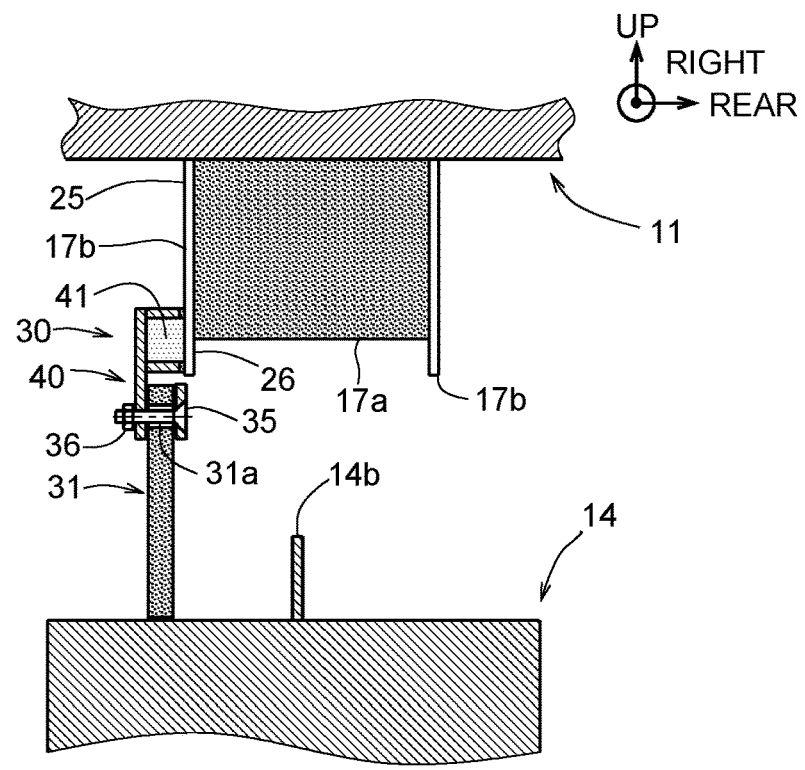
FIG. 8 is an enlarged cross-sectional view of the wind-and-rain guard device for shipping showing another embodiment.
Figure 9:
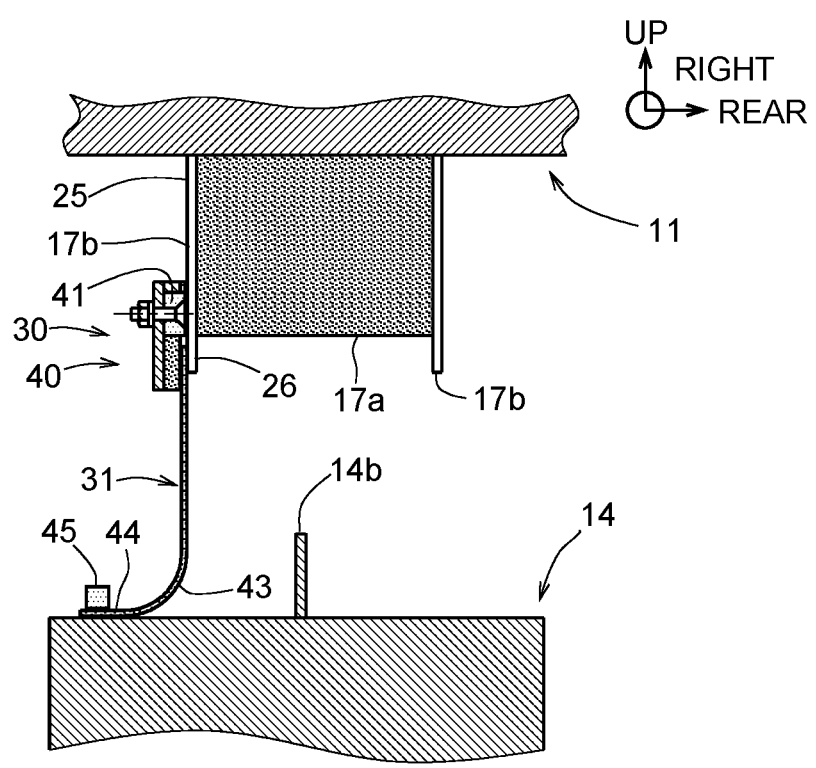
FIG. 9 is an enlarged cross-sectional view of the wind-and-rain guard device for shipping showing another embodiment.

(4) The wind-and-rain guard device for shipping 30 is mounted on the hatch coaming 14, but is not limited to this. As shown in FIG. 8, for example, the wind-and-rain guard device for shipping 30 may include a hanger part 40 that is detachably provided on the sliding hatch cover 11 such as the seal holding part 17b instead of the stand part 32. In this case, the hanger part 40 may suspend the water-stop member 31. Further, the hanger part 40 may include a magnet 41. As a result, the hanger part 40 can be attached to the sliding hatch cover 11 made of magnetic material such as iron by magnetic force of the magnet 41. (5) Further, if the wind-and-rain guard device for shipping 30 includes the hanger part 40, the water-stop member 31 may be formed in a sheet shape as shown in FIG. 9. In this case, it is preferable that a bent part 43 that is bent forward or backward, and a mounting allowance 44 that is placed on the hatch coaming 14 are formed at the lower end part of the water-stop member 31. Further, on the mounting allowance 44, a fastening member 45 for fastening the mounting allowance 44 on the hatch coaming 14 may be provided. The fastening member 45 may be comprised of magnet. The fastening member 45 may be comprised of a weight for fastening the mounting allowance 44 by its own weight.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A wind-and-rain guard device for shipping adapted to a ship comprising a hatch coaming provided upright on a deck at an outer circumference of an upper opening of a hold, and a sliding hatch cover to open and close the upper opening,
   wherein the sliding hatch cover is seated on the hatch coaming when closed, and is lifted and separated from the hatch coaming when opened, and
   the wind-and-rain guard device for shipping comprises a water-stop member that closes a gap formed between the sliding hatch cover and the hatch coaming when the sliding hatch cover is lifted from the hatch coaming.

2. The wind-and-rain guard device for shipping according to claim 1, wherein the water-stop member is formed in a plate shape.

3. The wind-and-rain guard device for shipping according to claim 2, further comprising a stand part that is placed on the hatch coaming and holds the water-stop member in an upright state.

4. The wind-and-rain guard device for shipping according to claim 3, wherein
   the sliding hatch cover includes a seal holding part for holding a seal member to be seated on the hatch coaming,
   the seal holding part has a lower end part protruding downward from the seal member, and
   two water-stop members are provided on the stand part so as to sandwich the lower end part of the seal holding part.

5. The wind-and-rain guard device for shipping according to claim 1, wherein the water-stop member is formed in a sheet shape.

6. The wind-and-rain guard device for shipping according to claim 2, further comprising a hanger part detachably provided on the sliding hatch cover for suspending the water-stop member.

7. The wind-and-rain guard device for shipping according to claim 5, further comprising a hanger part detachably provided on the sliding hatch cover for suspending the water-stop member.

* * * * *